(12) United States Patent
Mauer et al.

(10) Patent No.: US 9,022,774 B2
(45) Date of Patent: *May 5, 2015

(54) METHOD AND APPARATUS FOR FORMING UNIT PORTIONS OF FROZEN FOOD MATERIALS

(76) Inventors: James E. Mauer, Rome, GA (US); Benedict DiGerlando, Cedar Bluff, AL (US)

(*) Notice: Subject to any disclaimer, the term of this patent is extended or adjusted under 35 U.S.C. 154(b) by 4 days.

This patent is subject to a terminal disclaimer.

(21) Appl. No.: 13/493,332

(22) Filed: Jun. 11, 2012

(65) Prior Publication Data

US 2012/0288613 A1 Nov. 15, 2012

Related U.S. Application Data

(62) Division of application No. 13/106,447, filed on May 12, 2011, which is a division of application No. 12/032,729, filed on Feb. 18, 2008, now Pat. No. 8,110,236.

(51) Int. Cl.
| | | |
|---|---|---|
| A22C 7/00 | (2006.01) | |
| A23L 1/00 | (2006.01) | |
| A23L 1/31 | (2006.01) | |
| A23L 1/315 | (2006.01) | |
| A23P 1/10 | (2006.01) | |

(52) U.S. Cl.
CPC .............. *A23L 1/0073* (2013.01); *A22C 7/0084* (2013.01); *A23L 1/0076* (2013.01); *A23L 1/3103* (2013.01); *A23L 1/3152* (2013.01); *A23P 1/105* (2013.01)

(58) Field of Classification Search
CPC .. A22C 7/0046; A22C 7/0076; A22C 7/0084; A22C 7/0023; A22C 7/003; A22C 7/0038; A22C 7/0053; A22C 7/0061; A22C 7/00; A23L 1/0073; A23P 1/025; A23P 1/027; B29C 43/00; B29C 43/34

USPC ........... 425/112, 121, 126.1, 129.1, 193, 195, 425/239, 240, 256, 257, 258, 260, 261, 444, 425/449, 167, 345, 346, 353, 355, 406, 408, 425/413, 422, 443; 426/512, 513

See application file for complete search history.

(56) References Cited

U.S. PATENT DOCUMENTS

| | | | | |
|---|---|---|---|---|
| 1,928,877 A | * | 10/1933 | Britt et al. | 99/351 |
| 1,928,917 A | * | 10/1933 | Vanderkloot | 99/351 |
| 1,981,889 A | * | 11/1934 | Wolff | 99/351 |
| 2,021,794 A | * | 11/1935 | Leone | 425/574 |
| 2,413,046 A | * | 12/1946 | Holly | 425/556 |
| 3,040,654 A | * | 6/1962 | Opie | 100/347 |
| 3,203,037 A | * | 8/1965 | Anhanger et al. | 425/556 |
| 3,347,176 A | * | 10/1967 | Hall | 426/420 |
| 3,638,554 A | * | 2/1972 | Ackroyd | 426/407 |
| 3,722,398 A | * | 3/1973 | Freye et al. | 425/204 |
| 3,724,026 A | * | 4/1973 | Gernandt | 425/117 |
| 3,765,056 A | * | 10/1973 | Holly | 425/556 |
| 3,842,260 A | * | 10/1974 | Christensen et al. | 250/221 |

(Continued)

*Primary Examiner* — Seyed Masoud Malekzadeh
(74) *Attorney, Agent, or Firm* — Stephen J. Stark

(57) ABSTRACT

An apparatus for forming pressed food products can utilize up to 98% chicken breast meat in high profit margin products. Breast meat is marinated and then extruded into a slab which is then frozen and shaped into a plank. The plank is sliced into unit portions which are then pressed into shaped portions with a preferred, or other, press. One preferred press linearly reciprocates unit portions into the press. This or another preferred press imparts three dimension exterior shape to the pressed food products.

6 Claims, 6 Drawing Sheets

(56) References Cited

U.S. PATENT DOCUMENTS

| | | | | |
|---|---|---|---|---|
| 3,852,507 A * | 12/1974 | Toby | | 426/513 |
| 3,854,391 A * | 12/1974 | Ackroyd | | 99/349 |
| 3,864,891 A * | 2/1975 | Piereder | | 53/436 |
| 3,887,964 A * | 6/1975 | Richards | | 425/556 |
| 3,905,735 A * | 9/1975 | Thomas et al. | | 425/256 |
| 3,943,601 A * | 3/1976 | Kuhlman | | 425/441 |
| 3,943,602 A * | 3/1976 | Siclari | | 425/338 |
| 4,043,728 A * | 8/1977 | Holly | | 425/256 |
| 4,054,967 A * | 10/1977 | Sandberg et al. | | 426/512 |
| 4,113,415 A * | 9/1978 | Holly | | 425/542 |
| 4,118,169 A * | 10/1978 | Haluska | | 425/583 |
| 4,118,831 A * | 10/1978 | Holly et al. | | 425/562 |
| 4,126,704 A * | 11/1978 | McCarthy et al. | | 426/304 |
| RE30,096 E * | 9/1979 | Richards | | 425/562 |
| 4,193,167 A * | 3/1980 | Orlowski et al. | | 425/556 |
| 4,276,318 A * | 6/1981 | Orlowski et al. | | 426/513 |
| 4,281,593 A * | 8/1981 | Gevaert | | 99/349 |
| 4,334,339 A * | 6/1982 | Holly | | 425/562 |
| 4,516,291 A * | 5/1985 | Goldberger et al. | | 426/513 |
| 4,535,505 A * | 8/1985 | Holly et al. | | 426/513 |
| 4,541,143 A * | 9/1985 | Holly | | 426/513 |
| 4,597,135 A * | 7/1986 | Holly et al. | | 426/513 |
| 4,608,731 A * | 9/1986 | Holly | | 426/513 |
| 4,659,578 A * | 4/1987 | Schlegel | | 426/418 |
| 4,685,877 A * | 8/1987 | Harada | | 425/190 |
| 4,744,204 A * | 5/1988 | Schlegel | | 53/526 |
| 5,037,350 A * | 8/1991 | Richardson et al. | | 452/174 |
| 5,182,120 A * | 1/1993 | Kusters et al. | | 425/238 |
| 5,658,608 A * | 8/1997 | Klefbeck | | 426/512 |
| 5,730,650 A * | 3/1998 | Soper | | 452/174 |
| 5,960,705 A * | 10/1999 | D'Alterio et al. | | 99/349 |
| 6,468,575 B2 * | 10/2002 | Leech et al. | | 426/513 |
| 6,997,699 B2 * | 2/2006 | Gallina | | 425/556 |
| 7,175,417 B2 * | 2/2007 | LaBruno et al. | | 425/556 |
| 7,416,753 B2 * | 8/2008 | Lindee et al. | | 426/513 |
| 2002/0115402 A1 * | 8/2002 | Sandberg | | 452/174 |
| 2003/0113422 A1 * | 6/2003 | Groneberg-Nienstedt et al. | | 426/513 |
| 2004/0224051 A1 * | 11/2004 | LaBruno | | 425/556 |
| 2004/0244602 A1 * | 12/2004 | LaBruno et al. | | 99/353 |
| 2005/0042321 A1 * | 2/2005 | LaBruno et al. | | 425/408 |
| 2005/0230875 A1 * | 10/2005 | Miller et al. | | 264/177.11 |
| 2006/0110510 A1 * | 5/2006 | Tournour et al. | | 426/513 |
| 2007/0054005 A1 * | 3/2007 | LaBruno et al. | | 425/408 |
| 2007/0184145 A1 * | 8/2007 | LaBruno et al. | | 425/406 |
| 2008/0066627 A1 * | 3/2008 | Lamartino et al. | | 99/447 |
| 2008/0089971 A1 * | 4/2008 | Sandberg et al. | | 425/430 |
| 2009/0241472 A1 * | 10/2009 | Lindee et al. | | 53/443 |
| 2009/0255419 A1 * | 10/2009 | Kirsch | | 99/538 |
| 2010/0040752 A1 * | 2/2010 | Doner et al. | | 426/512 |
| 2010/0104412 A1 * | 4/2010 | Abascal Albizu et al. | | 414/795.2 |

* cited by examiner

METHOD AND APPARATUS FOR FORMING UNIT PORTIONS OF FROZEN FOOD MATERIALS

CLAIM OF PRIORITY

This application is a divisional application of U.S. patent application Ser. No. 13/106,447 filed May 12, 2011 which is a divisional application of Ser. No. 12/032,729 filed Feb. 18, 2008, now U.S. Pat. No. 8,110,236.

FIELD OF THE INVENTION

The present invention relates to a method and apparatus for forming unit portions of frozen food materials, and at least in a particular embodiment, shaping portions of meat such as chicken breast meat into a desired configuration whereby a significantly higher yield of breast meat from chickens can be utilized for high-quality chicken breast products.

BACKGROUND OF THE INVENTION

The applicant has significant experience in the food preparation arena. Patents for processing chicken portions include U.S. Pat. Nos. 5,080,631 and 5,078,644. However, in processing food particularly chicken breast, it was observed by the applicant that a normal chicken breast as taken from a chicken is usually cut into only six chicken breast cutlets with the remainder of the chicken breast being utilized in other lower profit margin chicken products. Processors would normally covet 20 to 24 oz. chicken breasts, which would then be cut into six 2.5 oz. chicken breasts portions for a total usage of 15 of the 20 to 24 ounces. Thereby a maximum utilization of this type meat product would be around 62.5 to 75% at best for this high profit margin product. The remainder of the breast meat has been utilized in the past for lower profit margin products.

Often the breasts are provided at 30 to 40 ounces. This translates into a highest percentage of yield of this type product to be around 50%, and could be as low as 37.5%. With this type product, the breast is usually cut symmetrically down the middle. A lower portion of the breast is then cut into a first breast portion and then a portion above that is cut into a second breast portion. The thicker of those two portions would be cut in half to provide the respective six chicken portions shaped like breasts as are often bought in the grocery store as de-boned chicken breasts or are provided as chicken cutlets for chicken sandwiches. The remainder of the chicken breast is then often processed into nuggets or other lower profit margin chicken products.

In the fish industry, fishermen have been preparing fillets at sea and/or at fish processing units and then freezing fish filets as blocks. A box is normally filled and frozen containing the filets forming a block. Blocks are cut into slabs which are then cut into fish sticks such as is shown in U.S. Pat. Nos. 2,643,952 and 3,294,012. Furthermore, frozen fish can also be processed into desired shapes as shown in U.S. Pat. No. 4,474,823.

However, in spite of this technology, there has still not been a good way to deal with efficiently utilizing poultry breast meat. Furthermore, although efforts have been made to produce desired shapes of food such as is shown in U.S. Pat. Nos. 6,203,838 and 6,521,280, the applicant believes that improvements to existing food processing equipment can be provided over prior art designs.

SUMMARY OF THE INVENTION

It is an object of at least one embodiment of the present invention to provide an improved process and/or shaper for consistently providing a desired shape food product to the market with a higher percentage of higher profit margin products.

It is another object of the present invention to provide an improved process and/or shaping station for providing shaped food products.

It is another object of at least one embodiment of a presently preferred embodiment of the present invention to provide an improved process for utilizing a significantly higher percentage of chicken breast meat in higher profit chicken breast portions as has been previously provided to the market. Although chicken breast meat is a current focus of the applicant, other meats such as beef, pork, seafood of various varieties and even non-meat food such as vegetables, fruit or combinations of various foods could be treated with the method and apparatus as disclosed herein. Reference will be principally made throughout this disclosure referencing the chicken breast embodiment, but those of ordinary skill in the art will see how similar embodiments could be provided for various other food product embodiments.

In accordance with a presently preferred embodiment of the present invention, a method for processing chicken breast meat into chicken portions includes providing a split breast which has been taken from a processed chicken, marinating and then extruding the meat into a slab and then freezing the slab. The frozen slab is then shaped into a symmetrical plank if not already symmetrically formed and then portions are then cut to a specific weight and shape. The cut portions are then loaded into a magazine for feeding into a shaper where the cut portions are shaped into a desired configuration such as the shape of a chicken breast as would be bought in a grocery store or the shape of a chicken breast as would be provided at a fast food restaurant as a chicken breast for a chicken breast sandwich or other use. Of course, other food and/or meat products can be utilized as well in other embodiments and shaped into suitable configurations.

Utilizing the applicant a rather unique shaper configuration with at least one embodiment, which may have a double cylinder arrangement and linearly reciprocating tray which feeds cut pre-weighed portions into the shaper in a mold and/or other structure with at least one cavity at a shaping station. The formed product is then shaped with the mold and/or cavity. The mechanism is preferably all hydraulic and pneumatic to eliminate electrical issues which can occur in food processing plants due to harsh environments created during cleaning operations.

BRIEF DESCRIPTION OF THE DRAWINGS

The particular features and advantages of the invention as well as other objects will become apparent from the following description taken in connection with the accompanying drawings in which.

DETAILED DESCRIPTION OF THE PREFERRED EMBODIMENT

Figure 1:
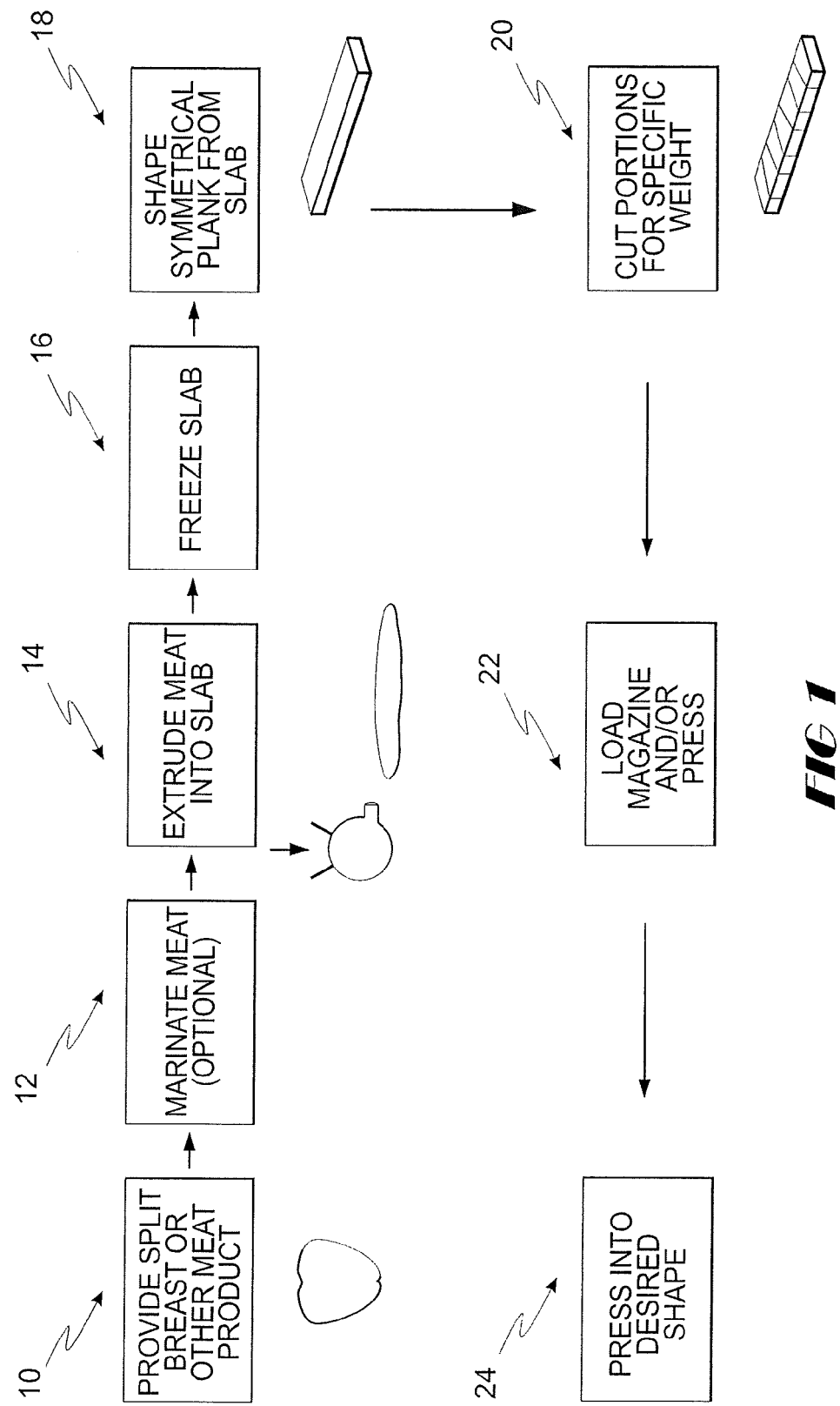
FIG. 1 is a schematic diagram of a method of processing food of a presently preferred embodiment of the present invention.

FIG. 1 shows a presently preferred embodiment of the present invention showing a method of providing high quality shaped food portions to the marketplace. Specifically, the process illustrated begins at step 10 where a split breast, whole butterfly or other food product is provided. The food product is preferably processed in that in the case of chicken, the feathers have been removed, it has been eviscerated and the particular meat to be processed, in this case, the chicken breast, has been removed from the bone and remainder of the chicken. For other food, such as vegetables, washing and or other processing steps may all that may be performed. Removal of seed pods, scales, bones, carcasses or shells may be performed for chicken and/or other food to provide processed food.

Meat processing usually involves hide and/or feather removal, eviscerating and at least partially butchering at least one of poultry, beef, pork, fish, or other seafood product. Other food products may be treated as would be known by those of ordinary skill in the art. After obtaining the food such as meat product, it is preferably marinated either individually or together in batch, continuous or other process in step 12. This may be optional in some processes but as it relates to meat and in particular poultry, marinating in a solution of salt, phosphate and water has been found to assist in extracting protein to a surface of the chicken. This has been found to make the chicken somewhat "sticky" as a raw material. Other food products may not require this step and/or this step may be skipped in some embodiments.

Next, the food is preferably extruded into a slab at step 14 along with other similar and/or dissimilar portions of food depending on the particular desired end product. Once a slab has been extruded, the slab in then preferably frozen in step 16. After freezing the slab, it is preferably shaped into a plank of specific dimensions. One method of shaping is described below with reference to FIG. 11. Other methods of shaping may be employed with other embodiments.

Instead of providing a rectangular cross section as may be visualized taken from the top down as is shown in U.S. Pat. No. 2,643,952 except for the fact that fish product is not extruded but is merely frozen in block form typically in a box, the top down cross section is anticipated to be a non-rectangular parallelogram of a known dimension so that preferably all of the portions that are cut from the slab are done in such a way that there is a minimum, if any waste. Specifically, in the fish stick business, the ends of the slab are traditionally differently shaped than all the intermediate portions of the slab. This irregularity can be eliminated by the use of a parallelogram type cross section. The lateral cross section remains rectangular in the preferred embodiment.

After forming the frozen slab, portions of the slab can be cut, or more preferably sliced, to a specific weight and/or shape so that each of the portions have a specific weight and shape depending on the formed shape for which they are to be provided. Portions are cut at step 20 after being shaped in a plank at step 18. After cutting the portions for a specific size and/or weight at step 20, they are then loaded into a magazine at step 22 and/or directly into a shaping station in step 24. Shaping station shapes the food item into a desired configuration as shall be shown and described in reference to the shaping station of the presently preferred embodiment as shown in FIGS. 2-9F and described below.

Although a preferred shaping station can be utilized in conjunction with the above method, it is worth observing that any suitable alternative can be utilized in connection with the method as shown and described in reference to FIG. 1. When utilizing this method, it is estimated that at least about 80%, about 90%, and even up to about 98% of a chicken breast can be shaped into high quality chicken breast meat portions. Remember, by marinating the meat, the chicken becomes somewhat sticky on the surface. This is believed to be helpful in at least some embodiments. When a slab is cut into planks and is then cut into unit portions, those unit portions although possibly made up of more than one chicken breast portion are relatively securely stuck together so that when they are shaped into a chicken breast shape or other shape, the purchaser and person eating the product should not be able to tell that the shaped product is comprised of more than one piece of chicken as provided to the market place.

In the past, chicken breast meat was at best 75% utilized for 2.5 ounce chicken breast portions, wherein the applicant's preferred method it is estimated that up to 98% of the split chicken breast can be utilized for high quality chicken breast consumer products like 2.5 ounce chicken breasts. As a worst case scenario, in a situation in which six 2.5 ounce breast portions are taken from a 40 ounce split breast, less than 40% were utilized for this high quality application. Therefore, the applicant's method providing a higher return to the food processor than has previously been known with prior art techniques.

The applicant's method preferably utilizes the step of extrusion into a slab prior to freezing. It may be that extruding directly into planks may be performed and/or other technology may employed such as that shown and described in U.S. Pat. No. 6,521,280 by AEW International Limited such that a slab could be sized and cut in portions of a desired weight and/or shape in other embodiments.

Additionally, the present embodiment of shaping the plank with a top down non-rectangular parallelogram cross section having a desired thickness so that particular cuts preferably with a knife or blade rather than a saw are known to produce a specific weight of meat and shape prior to shipping is also believed to be desirable in that there is almost no waste. Of course, other embodiments could take non-conforming sized portions and possibly join them together in their own plank and then continue the processing steps to shape them into a desired configuration.

When portions are cut in step 20, it is preferred to cut with a knife type arrangement as saws which have been previously utilized in the fish industry are known to produce fish sawdust which is believed to waste up to 20% of the block material which cannot then be easily processed into fish portions. Extremely little waste is experienced with knife cuts.

When freezing the slabs in step 16, it is anticipated to freeze to about zero degrees but other temperatures useful in a particular food segment could be utilized. When shaping the slab into a plank at step 18, the presently shape is somewhat like a 2×4 except that it could have other dimensions depending on a particular outcome for a desired unit shape.

Freezing can be done by the emersion of liquid nitrogen then to a mechanical freezer or a flip flop freezer and any other of the freezing techniques which are known in the art including freeze on paper, a plate freezer, etc.

With a method similar to the preferred embodiment described above, beef could be formed in a cube steak or a formed steak of an exact proportion utilizing a similar technique. Furthermore, turkey, veal, fish, seafood, pork or other product could be similarly shaped into a desired shape of known physical volume. A pork loin could be formed or any other the other desired outcome could likely be achieved.

Figure 2:
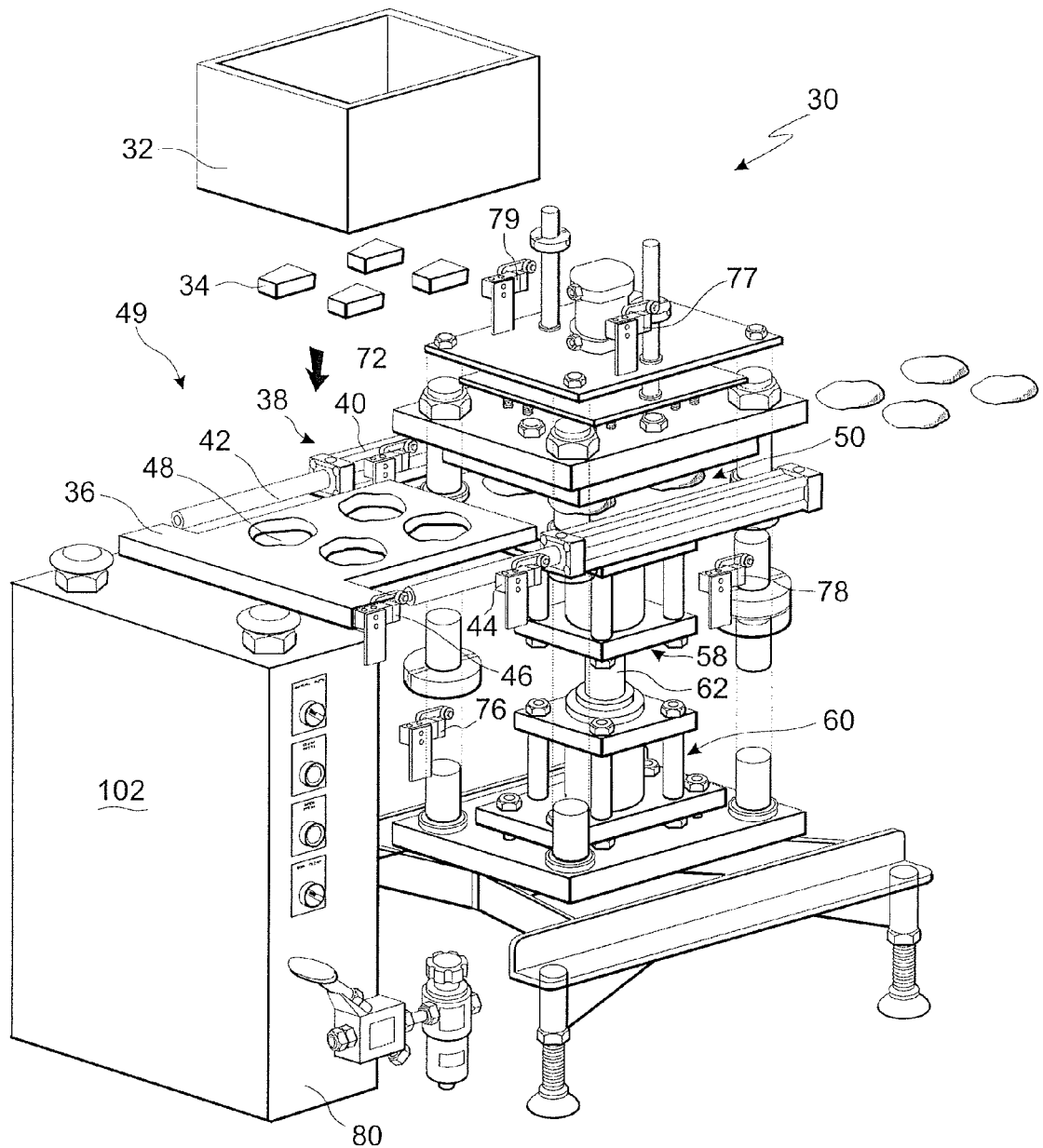
FIG. 2 is a perspective assembly view of a shaper constructed in accordance with the presently preferred embodiment of the present invention as may be used in the method shown and described in FIG. 1.

FIG. 2 shows an assembled shaper 30 of the presently preferred embodiment of the present invention as may or may not be utilized in step 24 of FIG. 1 as shown and described above. This shaper 30 is believed to have desirable features in the food processing industry.

Magazine 32 preferably provides cut portions 34 which are preferably sized of a known size, shape and/or weight to feed plate 36. Feed plate 36 is preferably linearly or otherwise reciprocated with drivers 38 such as cylinders 40 connected to pistons 42. As illustrated, feed plate 36 linearly reciprocates in and out relative to shaping station 50 which will be explained in further detail with reference to other drawings.

Limit switches 44,46 provide input to controller 80 shown in more detail in FIG. 8 which will be described in further detail below. Basically, the cut portions 34 are preferably deposited in or on the feed plate 36 such as in receivers 48 at a loading station 49. Feed plate 36 transports the cut portions 34 to the shaping station 50. FIGS. 9A-F are useful in showing this process. FIG. 9A shows the cut portions 34 being placed in the feed plate 36. In FIG. 9B the feed plate 36 is reciprocated onto first plate 52 which may be maintained parallel to feed plate 54 during this operation. Shaped product 56 may be ejected as will be explained in further detail below such as with a leading edge 58 of feed plate 36 in this presently preferred embodiment.

In FIG. 9C, the first plate 52 is lowered such as with one or more cylinders 58,60 so that the cut portions 34 remain in the shaping station 50 while the first plate 36 is retracted towards the load configuration shown in FIG. 9A.

In the presently preferred embodiment, with a two cylinder 58,60 construction, both cylinders are at least partially, if not fully, retracted when in the configuration shown in 9C. At least one of the two cylinders then start extending after the end 58 has cleared the shaping station 50. Once at least one of the two cylinder, 58,60 has extended to the desired length of extension with rods 62 (the other rod not shown), the first plate 52 is preferably disposed against second plate 64 under a desired pressure to cause the cut portions 34 to conform to a predetermined exterior shape at least similar to the cavity 66 such as under about 1,000 psi or other appropriate pressure. After shaping to the configuration as shown in FIG. 9D, at least one of the two cylinders 58,60 begins to retract to the retracted position thereby lowering the first plate 52. Meanwhile, strike plate 68 is preferably moved relative to stationary plate 70 and/or second plate 64 so that pins 72 may extend downwardly into at least one cavity 66 to dislodge shaped food item 74 from cavity 66. After reaching the position shown in FIG. 7-9E which is somewhat similar to the position shown in 9A, the process can begin again as shown in FIG. 9F with the ejection of the formed product 56.

During method of an embodiment as shown in FIG. 9A, the first cylinder 58 may be extended with a second cylinder 60 retracted such as until the support plate 54 is lined up with the first plate 52. This would provide a relatively linear surface for the feed plate 36 to slide across with linear reciprocation of the cylinders 38. With the two cylinders 58,60 retracted such as is shown in the representation of FIG. 9C, there is preferably sufficient clearance for feed plate 36 to be retracted out of the shaping station 50 so that the loaded cut portions 34 can remain in the shaping station 50. With the feed plate 36 retracted out of the way, one or both cylinders can extend a desired amount such as to fully extend as shown in FIG. 9D to provide shaped product 56. Then at least one of the two cylinders 58,60 can then begin to be retracted until the first plate 52 becomes level with the feed plate 54. As shown in FIG. 9E, the strike plate 68 can be utilized against pins 72 to at least partially assist in ejecting the shaped food portions 56 from the cavity 66 in this embodiment. Hydraulics are preferably provided to cylinders 58,60 although pneumatics or other drivers could also be utilized for that purpose. Relay switches 44,46 as well as switches 76,78 and possibly others preferably provide input to controller 80. One or more cylinders 58,60 could be utilized in other embodiments.

Figure 8:
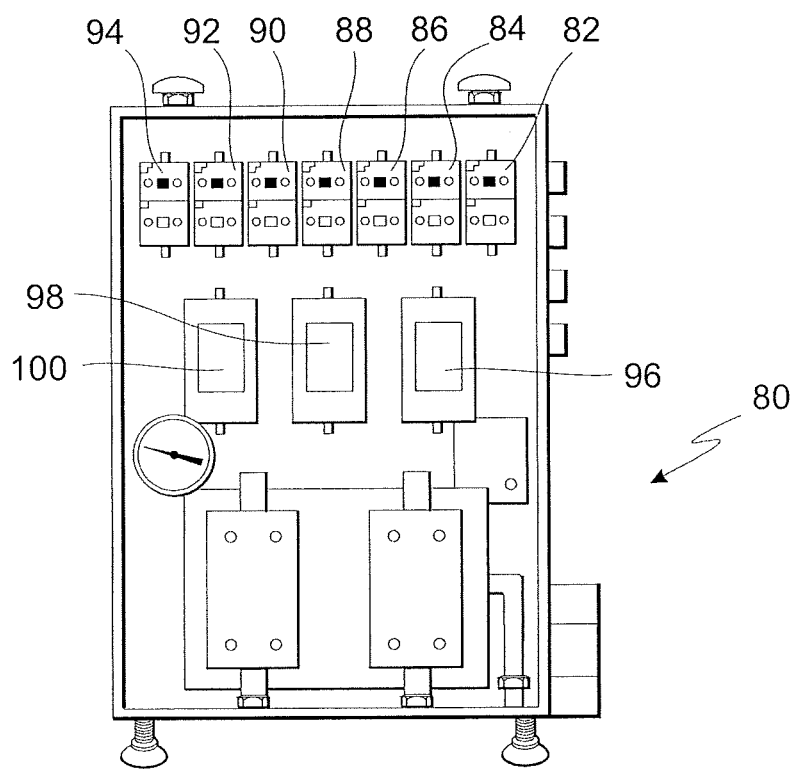
FIG. 8 shows a schematic of an internal portion of a controller shown in FIG. 2.
Figure 9:
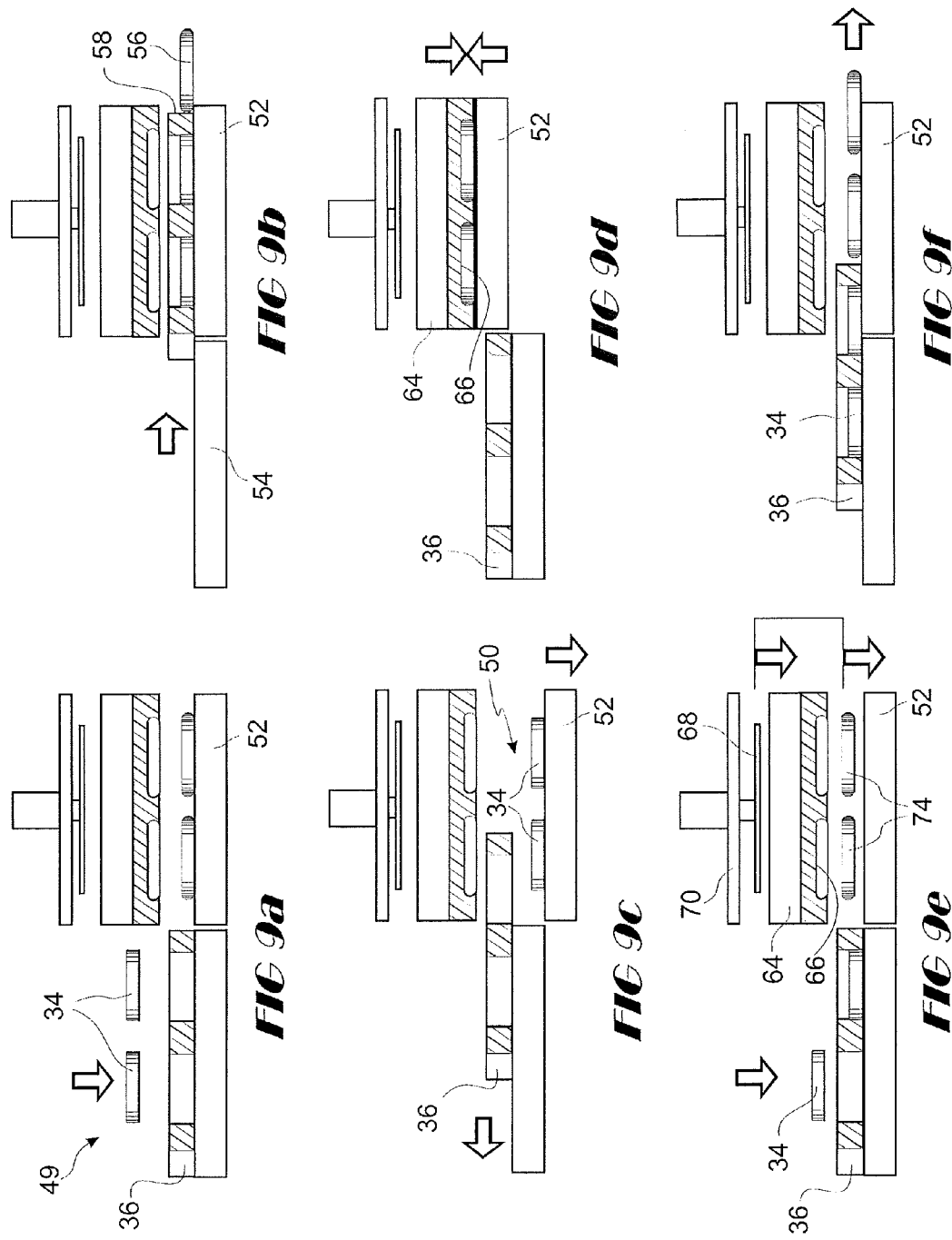
FIGS. 9A-9F show schematic views of the operation of the shaper of FIG. 2 in operation.

The internals of controller 80 of the presently preferred embodiment are shown in FIG. 8 which provide input to relays 82,84,86,88,90,92,94 so that a sequence of events occurs every time. Specifically, with the preferred embodiment cylinders 58,60 are fully extended. Limit switch 77 is preferably contacted in the presently preferred embodiment which supplies instruction to at least one relay 82,84,86,88, 90,92,94 for at least one of the cylinders 58,60 to begin retraction. As one or more cylinder retracts, the strike plate 68 can contact pin 72 to dislodge the shaped portions 56 from cavity 66. On the down stroke, after the switch 79 is contacted switch 78 may be contacted and/or other switch to thereby indicate that the first plate 52 is level with feed plate 54 which can then start the process of cycling a loaded feed plate 36 into the shaping station 50. After limit switch 44 is contacted, the second cylinder 60 can retract cylinder 62 to clear the loaded cut portions 34 shown in FIG. 9C. Once the second switch 76 is contacted, the feed plate 36 can be retracted back out to the position shown in FIG. 2 to contact limit switch 46 which can start the process of extending one or both cylinders 58,60 until one or more limit switches is contacted again. Then the pneumatic sequence can continue again through the various relays. Other embodiments may employ more or fewer switchables, relays or other components.

In the illustrated embodiment, relays 82,84,86,88,90,92,94 control operated valves for operation of various pneumatic and/or hydraulic compositions such as cylinders 58,60 and/or cylinder 38. Cabinet 102 is useful to protect all these interior components during cleaning. A scarcity of electrical components (i.e., none in the presently preferred embodiment) makes the shaper 30 particularly attractive for hazardous cleaning environments such as are often found in poultry processing plants.

Figure 3:
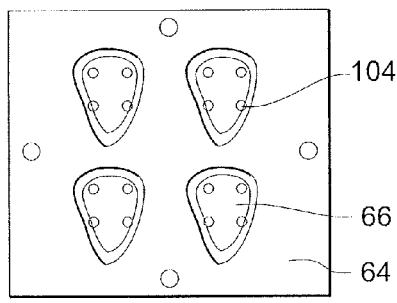
FIG. 3 shows a bottom plan view of a shaping plate used with the shaper in FIG. 2.
Figure 4:
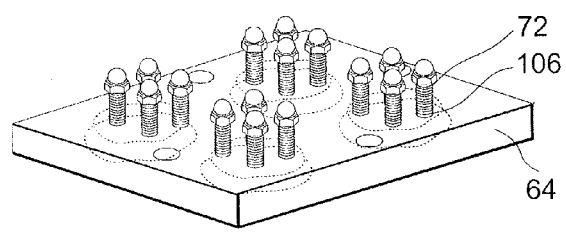
FIG. 4 shows a top perspective view of the shaping plate shown in FIG. 3 with bottom cavity portions shown in phantom.
Figure 5:
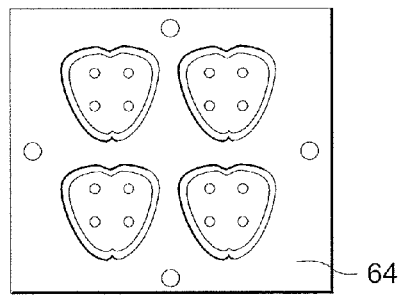
FIG. 5 shows a bottom plan view of a first alternative shaping plate configuration.
Figure 6:
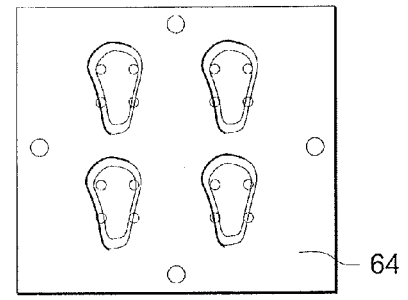
FIG. 6 shows a bottom plan view of a second alternative embodiment of a shaping plate configuration.
Figure 7:
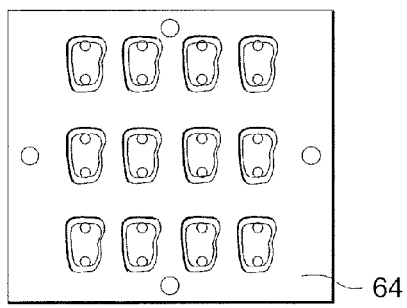
FIG. 7 shows a bottom plan view of a third alternative embodiment of a shaping plate configuration.

FIGS. 5,6 and 7 show alternative embodiments of the second plate 64 as shown in FIGS. 3 and 4 with pins 72 which may be utilized for ejection purposes from cavities 66. The embodiment shown in FIG. 3 is a breast configuration. FIG. 5 shows a butterfly or double breast configuration. FIG. 6 shows a thigh configuration and FIG. 7 shows a nugget or cube configuration. Other configurations could be a stick configuration, pork loin configuration, pork chop configuration, steak configuration, shrimp configuration or other desired shape of product based on the particular desires of the manufacturer. One or more pin 72 extends through cavities 66 during ejection and are preferably spring loaded or otherwise resiliently biased with one or more springs 106 so that they do not interfere with the shaping process. When the strike plate 68 contacts pin(s) 72 at a sufficient force to overcome a resiliency of the springs 106, pin(s) 72 extend down into the cavity 66 typically to assist in the ejection of a shaped product 56.

Figure 10:
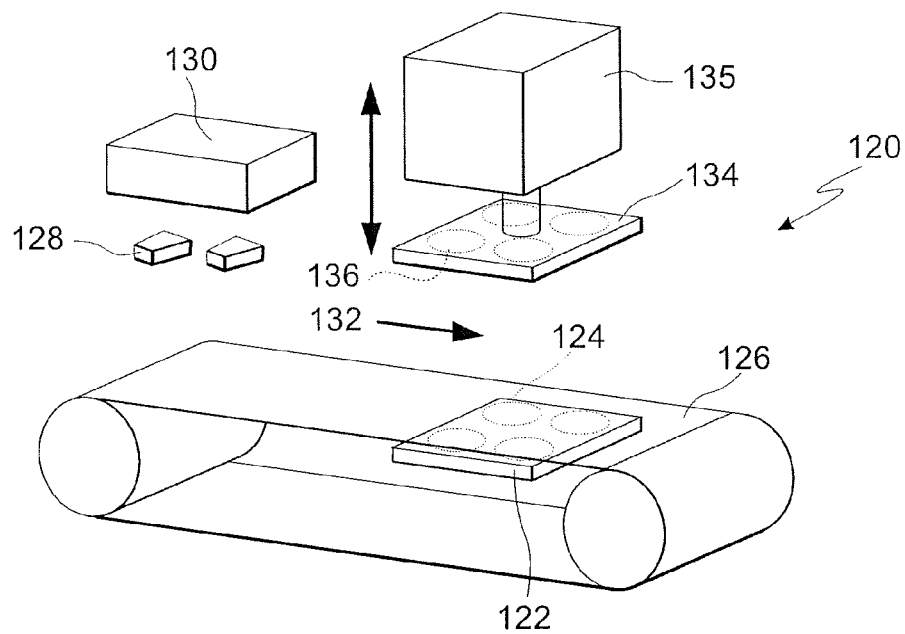
FIG. 10 shows a schematic view of an alternative embodiment of a shaper imparting a top and bottom configuration to a shaped food portion as well as conveyor means which may at least partially assist in ejecting the meat portion from the shaper.

FIG. 10 shows a schematic of an alternative configuration of a shaper 120. Shaper 120 preferably has a first plate 122 with cavity portion(s) 124 formed therein. Conveyor 126 preferably travels proximate to this bottom mold or first plate 122 to bring cut portions 128 from a magazine 130 into a shaping station 132. Once the cut portions 128 are in the shaping station 132, second plate 134 with cavities disposed therein may be downwardly directed so that the cut portions 128 are shaped between respective cavities 124 and 136 into a desired configuration. After shaping to the desired configuration, the second plate 134 may be retracted by cylinder 135. Any shaped portion remaining in cavity 136 may be ejected preferably with a pin assembly such as with a strike plate technique possibly not too different from that shown in the embodiments of FIGS. 2-9. Additionally, conveyor 126 may preferably be at least resilient enough so that it conforms at least partially to the cavities 124 of the first plate 122. As the second plate 134 is retracted away, conveyor 126 can then move and/or resiliently resume position to assist in removing shaped portions from cavities 124. In this manner, the shaped food portions can have not only a shaped upper and/or side surface(s) conforming to a desired shape such as cutlets have been provided with other prior art techniques but also have a shaped bottom surface. This results in items that are not necessarily all planar on one side. These products can more closely resemble actual dimensions and/or shape of the intended shape such as a breast, double breast, thigh portion, etc., as so desired, particularly if those shapes are not in fact all planar on one side.

Figure 11:
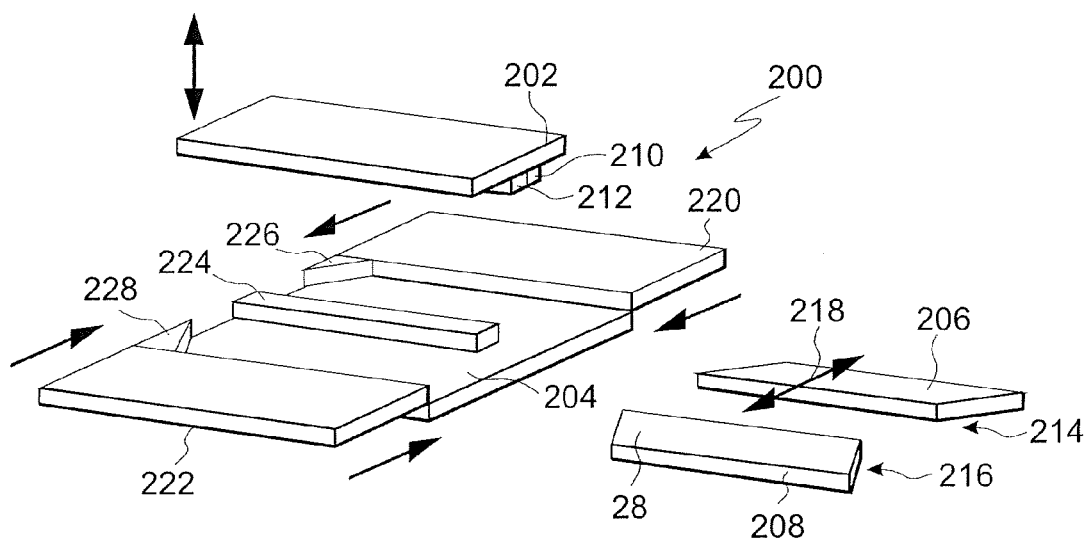
FIG. 11 shows a schematic view of the shaper of FIG. 2 with an alternating prefabrication shaping station.

FIG. 11 shows yet another shaper 200 in the presently preferred embodiment specifically first press plate. First plate 202 may move relative to second press plate 204 to shape slabs 206,208 therebetween. First plate 202 may have extensions 210,212 which may assist in providing ends 214,216 at an angle other than 90 degrees with the shaped slabs 206,208 of the preferred embodiment. As one can see, a cross section taken from a top down view of the shaped slabs 206,208 is that of a parallelogram and non-rectangular. The cross section taken along the lateral direction 210 through slab 206 remains a rectangular cross section in a preferred embodiment. The lateral direction 210 is illustrated perpendicular to the lateral axis 218 taken through the plank 206.

Slides can be utilized providing the shaped slab 206,208 configurations. Of course, in other embodiments, slides to at least assist in could enter from the left and right sides in addition to the front and back to provide the desired shape without the extensions 210,212 or extensions 226,228 illustrated. Divider 224 is illustrated fixed to second plate 204, but as one skilled in the art can see, these shaped slabs 206,208 could be created with two or more slides 220,224 to provide shaped slabs 206,208. Functionally, at least some of the shaper 200 can work similarly or dissimilarly to shapers 120 and/or 30.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A shaper for use in food processing operations for shaping frozen food into shaped food, said shaper comprising:
    a loading station receiving at least two individual frozen unit portions of a predetermined size;
    a shaping station; and
    a feed tray linearly reciprocatable intermediate the loading station and the shaping station; wherein the at least two individual frozen unit portions are simultaneously received into spaced apart cavities in the feed tray from the loading station and then moved with the feed tray into the shaping station where the at least two individual unit portions are simultaneously shaped with at least first and second plates into at least two frozen shaped portions having a predetermined exterior shape;
    wherein the feed tray is retracted out of the shaping station when shaping the at least two individual frozen unit portions and the at least two frozen shaped portions are removed from the shaping station; wherein the second plate has at least two cavities thereby imparting a configuration to the shaped portions so the shaped portions resembling the predetermined exterior shape; and wherein the feed tray has an edge which simultaneously contacts the at least two shaped portions when moving the feed tray into the shaping station thereby discharging shaped portions from the shaping station.

2. The shaper of claim 1 further comprising a magazine which feeds the individual unit portions into the feed tray at the loading station.

3. The shaper of claim 1 wherein the second plate at the shaping station have at least one cavity resembling a chicken breast and the unit portions are frozen chicken breast meat.

4. The shaper of claim 1 further comprising at least one ejector coupled to the first plate and after shaping the at least two shaped portions, said at least one ejection pin assists in ejecting the at least two shaped portion from the first plate.

5. The shaper of claim 1 further comprising at least one slide which moves perpendicularly to a direction of relative movement between the first and second plate and assists in providing the shaped portions.

6. A food shaper comprising:
    a loading station receiving discreet frozen unit food portions with a predetermined dimension;
    a shaping station;
    a linearly directed feeder moving at least two of the frozen unit food portions simultaneously from the loading station to the shaping station wherein the shaping station has a first plate at least assisting in defining at least two cavities below a belt conveyor and a second plate opposite the belt conveyor from the first plate; and the shaping station shaping the frozen unit portion into a frozen shaped portion, the shaped portions at least partially conforming to the shape of the at least two cavities with a pressed portion extending at least partially into the at least two cavities when the feeder is retracted out of the shaping station when simultaneously shaping the at least two unit portions and the frozen shaped portions are removed from the shaping station with the belt conveyor.

* * * * *